Patented Oct. 9, 1945

2,386,441

UNITED STATES PATENT OFFICE 2,386,441

BIS-TRIMETHYLSILICYL OXIDE AND ITS PREPARATION

William Herbert Daudt, Corning, N. Y., assignor to Corning Glass Works, Corning, N. Y., a corporation of New York No Drawing. Application September 1, 1943, Serial No. 500,856

3 Claims. (Cl. 260—607)

This invention relates to compositions of matter and their preparation and, more particularly, to organo-silicon compounds and their preparation.

The primary object of the present invention is to prepare a new composition of matter consisting of bis-trimethylsilicyl oxide,

[(CH₃)₃Si]₂O

Other objects will become apparent from the following description.

Trimethylsilicyl oxide may be prepared in the following manner. Trimethylethoxysilicane, (CH₃)₃SiOC₂H₅ whose preparation is described in my copending application Serial Number 500,855, filed September 1, 1943, is treated with water and a catalyst such as hydrochloric acid and then allowed to stand for a few minutes. The liquid reaction product is washed and dried. Upon distillation, the product distills at 99° C.

If water alone is employed to hydrolyze the trimethylethoxysilicane, the reaction proceeds slowly with the formation of an emulsion at an intermediate stage which is probably due to the presence of trimethylsilicol. The final product of the hydrolysis is trimethylsilicyl oxide.

Other catalysts than hydrochloric acid may be employed in the hydrolysis and condensation of trimethylethoxysilicane. For example, the trimethylethoxysilicane may be dissolved in cold concentrated sulfuric acid, and then poured into excess ice water. The oxide which is formed may then be extracted with ether. In general, I prefer to use strong acids and alkalis as catalysts.

It is advisable to avoid the use of solvents such as ether, benzene, or ethyl alcohol in the preparation of trimethylsilicyl oxide since it readily forms azeotropic mixtures, binary and ternary, with these solvents.

Trimethylsilicyl oxide has been found to be valuable as an intermediate in the production of organo-silicon oxide copolymers, particularly methyl silicon oxide copolymers. Copolymers which consist of the structural units

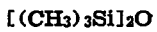

and

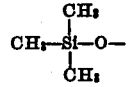

are especially useful as hydraulic fluids, damping fluids, etc., because they are very resistant to further polymerization and because they exhibit very low viscosity change with temperature. The trimethyl silicon units may be introduced into the copolymer by cohydrolyzing and co-condensing dimethyldiethoxysilicane and trimethylethoxysilicane. However, for various reasons it is desirable commercially to employ the more stable hydrolysis products as the starting materials for making the above copolymers. Since the hydrolysis products in their advanced stages of condensation contain few, if any, hydroxyl groups, it is not possible to copolymerize them by condensation with splitting out water. But it has been found that the trimethylsilicyl oxide readily copolymerizes with dimethyl silicone (and other silicones as well) in the presence of an acid or alkaline catalyst in accordance with the methods disclosed in my copending application Serial Number 481,152 filed March 30, 1943, and also in the copending application of James Franklin Hyde et al. Serial Number 481,153 filed March 30, 1943, particularly a strong acid or a strong alkali. Accordingly, trimethylsilicyl oxide is very useful as an agent for introducing trimethylsilicon units into silicones which are substantially or completely free of hydroxyl groups.

I claim:

1. The method of preparing trimethylsilicyl oxide which comprises hydrolyzing trimethylethoxysilicane and condensing the hydrolysis product.

2. The method of preparing trimethylsilicyl oxide which comprises hydrolyzing trimethylethoxysilicane in the presence of a strong acid catalyst and condensing the hydrolysis products.

3. Bis-trimethylsilicyl oxide.

WILLIAM HERBERT DAUDT.